(12) United States Patent
Wong et al.

(10) Patent No.: US 8,068,040 B2
(45) Date of Patent: Nov. 29, 2011

(54) OPTICAL ENCODER WITH INTEGRATED MONITOR

(75) Inventors: Weng Fei Wong, Penang (MY); Chee Foo Lum, Penang (MY); Siow Ming Tan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1616 days.

(21) Appl. No.: 11/066,919

(22) Filed: Feb. 25, 2005

(65) Prior Publication Data

US 2006/0192008 A1    Aug. 31, 2006

(51) Int. Cl.
*H03M 1/22* (2006.01)
(52) U.S. Cl. ............................................. 341/13; 341/11

(58) Field of Classification Search ............. 250/231.14; 356/218; 341/13, 11, 7, 15; 702/150, 50
See application file for complete search history.

(56) References Cited

U.S. PATENT DOCUMENTS

| | | | | |
|---|---|---|---|---|
| 4,920,259 A | * | 4/1990 | Epstein | 250/231.13 |
| 4,956,796 A | * | 9/1990 | Rogers et al. | 702/150 |
| 5,017,776 A | * | 5/1991 | Loewen | 250/231.14 |
| 6,992,757 B2 | * | 1/2006 | Holcomb et al. | 356/218 |
| 2004/0036017 A1 | * | 2/2004 | Ito | 250/231.13 |

* cited by examiner

*Primary Examiner* — Joseph Lauture

(57) ABSTRACT

A sensor head for sensing light modulated by a moveable member, such as a code wheel or code strip, in an optical encoder. The sensor head has at least one monitor optical sensor and a primary optical sensor positioned to receive light modulated by a modulation track on the moveable member. The monitor optical sensor provides a monitor signal that is compared in a signal comparator to the output from the primary optical sensor to detect light at the primary sensor.

18 Claims, 6 Drawing Sheets

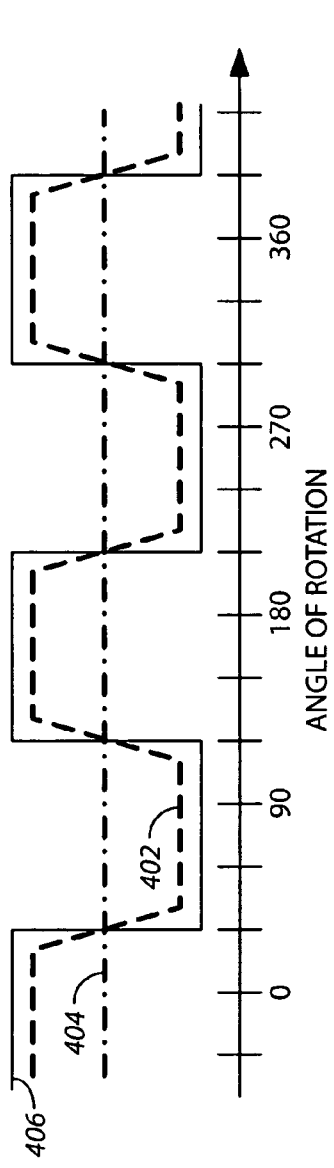
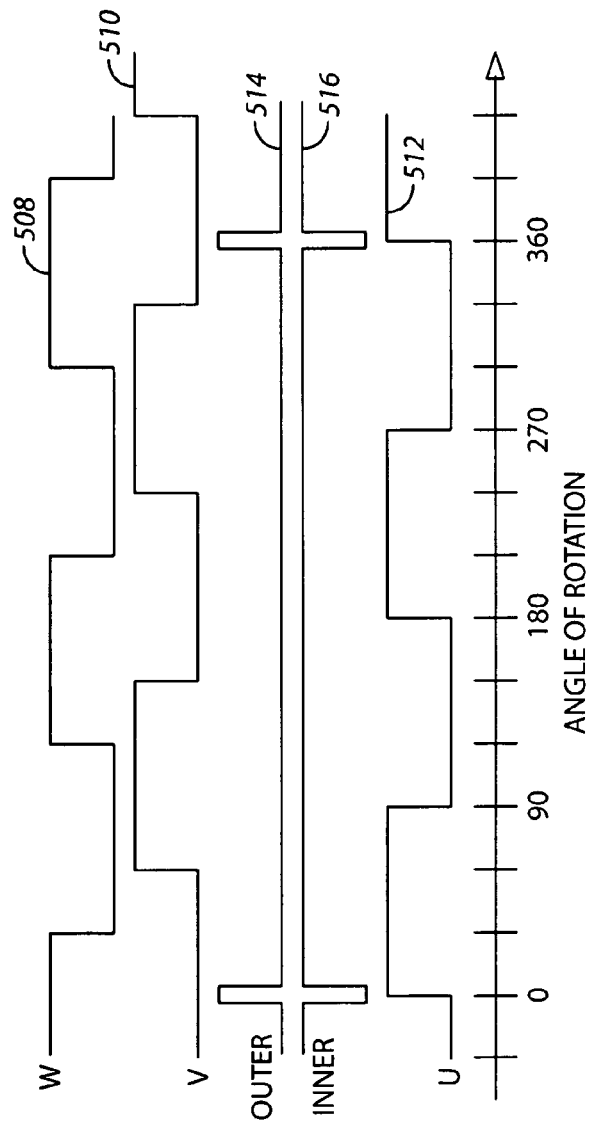
FIG. 4
FIG. 5

OPTICAL ENCODER WITH INTEGRATED MONITOR

FIELD

This invention relates generally to optical encoders. In particular, this invention relates to an optical encoder having an integrated monitor.

BACKGROUND

Optical shaft angle encoders are used for resolving the position or measuring rotation of a shaft. Such encoders include a light source for emitting a light beam, a code wheel for modulating the light beam in response to shaft rotation, and a photodetector assembly for receiving the modulated light and producing electrical signals indicating the amount of light received by the photodetectors.

As the light is modulated in response to shaft rotation, each electrical signal from the photodetector assembly produces a waveform. The position of the shaft determines the position of each signal on its particular waveform, i.e., the phase of each signal. Therefore, the electrical signals from the detectors can be used to indicate shaft rotation. The encoder may be used as a signal commutator, where the electrical signals are used to control field currents in a brushless D.C. motor.

Some shaft angle encoders have a code wheel with alternating opaque and transparent areas, and the light source and photodetectors are on opposite faces of the code wheel. Other shaft angle encoders have reflective areas so that the light source and photodetectors can be on the same face of the code wheel.

Optical position encoders operate using a similar principle and use a code strip rather than a code wheel. Linear motion of the code strip past a light source produces a modulated optical signal that is detected by one or more optical detectors.

As the light is modulated in response to shaft rotation, each electrical signal from the photodetector assembly produces a waveform. The electrical signal is compared to a threshold signal to produce a square wave or digital output signal. One problem that occurs is that the maximum level of light reaching an optical detector may vary, dependent upon the strength of the light source, and variations in the optical properties of the code wheel or code strip. For optimal performance, the threshold voltage level should be varied accordingly. One approach to this problem is to include a monitor track on the code wheel. The monitor track constantly detects the maximum light reaching a monitor photodetector. In one example, the area of the photodetector is selected to be half that of a primary photodetector, so that the output from the monitor photodetector can be used at the threshold level for a comparator.

A disadvantage of this approach is that the extra track on the code wheel increases the size of the code wheel and also increases the size of the associated photodetector array.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

FIG. 4 is a graph of encoder signals.
FIG. 5 is a further graph of encoder signals.

DETAILED DESCRIPTION

Figure 2:
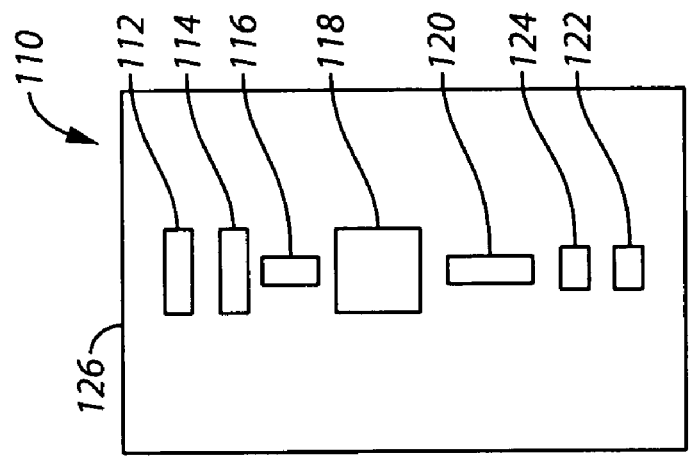
FIG. 2 is a diagram of an optical encoder sensor head of the prior art.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Figure 1:
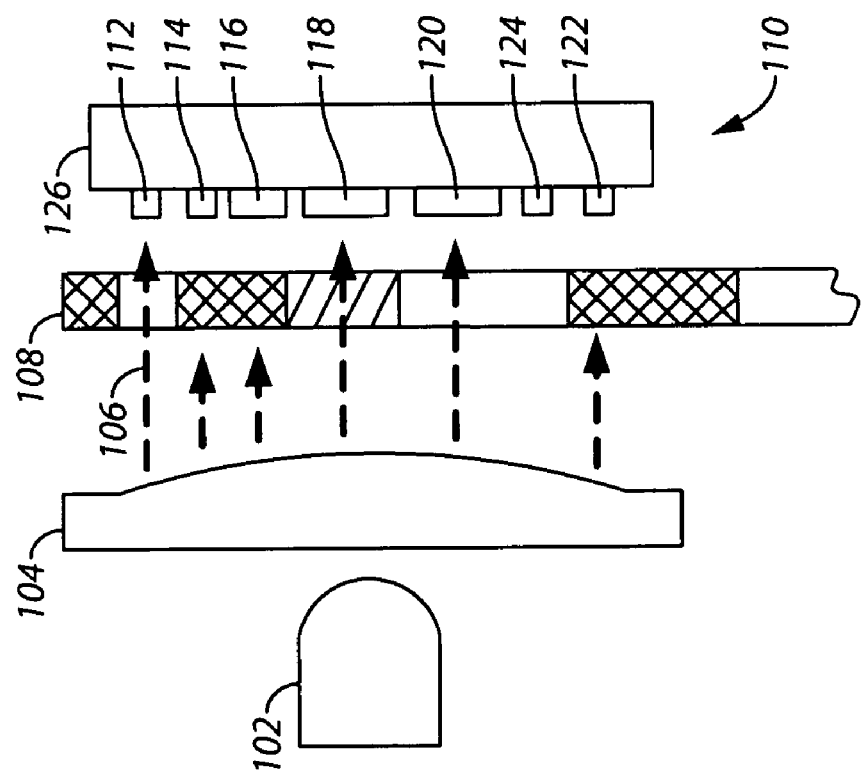
FIG. 1 is a diagram of an optical encoder of the prior art.

An optical encoder of the prior art is shown in FIG. 1. Referring to FIG. 1, light is generated by a light source 102, and is focused by lens 104. The focused light 106 impinges on a movable optical mask 108, which may be a code wheel or code strip. The movable optical mask 108 has one or more modulation tracks that allow or prevent the light 106 from reaching a sensor head 110 that comprises an array of primary optical sensors 112, 114, 116, 118, 120 and 122, a secondary or monitor optical sensor 124, and a signal processing circuit 126. The light 106 received by the monitor optical sensor 124 is not modulated by the movable optical mask 108, so the output from the monitor optical sensor 124 can be used to provide a threshold signal to the signal processing circuit 126.

FIG. 2 shows a typical arrangement of the primary optical sensors 112, 114, 116, 118, 120 and 122, and the secondary or monitor optical sensor 124 on a sensor head 110.

Figure 3:
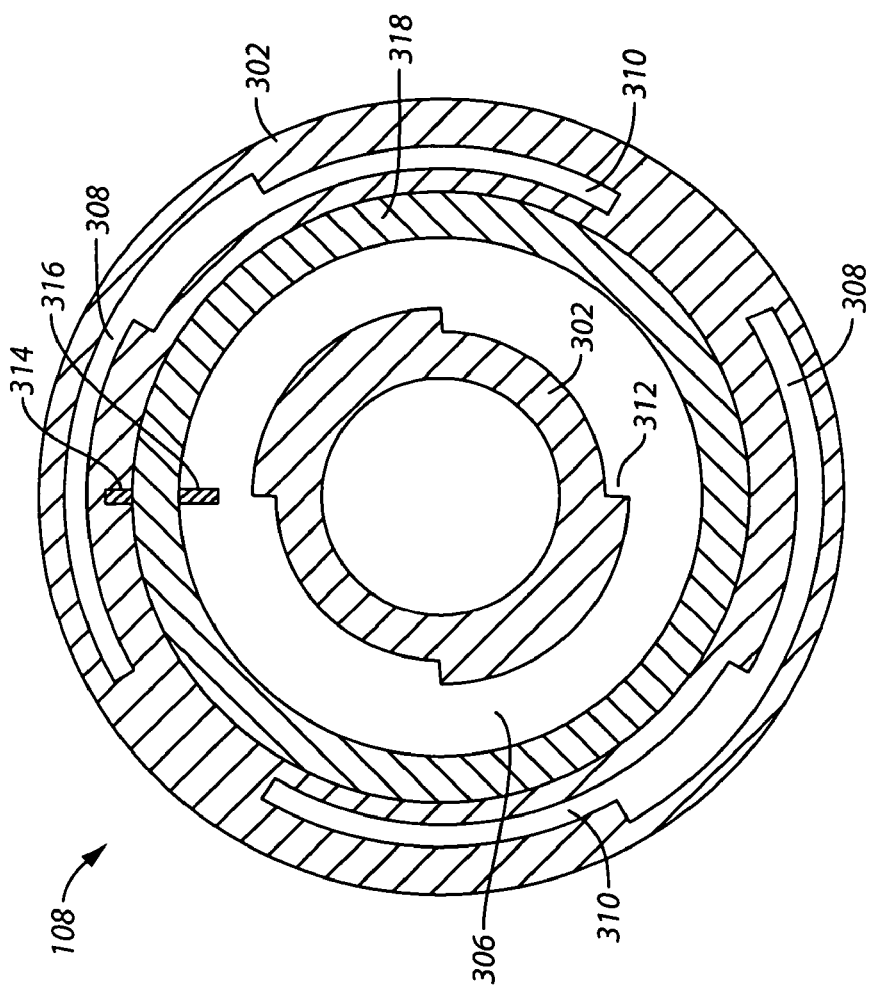
FIG. 3 is a diagram of a code wheel of the prior art.

An exemplary code wheel 108 is shown in FIG. 3. The code wheel comprises a number of opaque regions (302, 316), a number of transparent regions (306, 308, 310, 312 and 314) and a cyclic patterned region 318. These regions provide a number of circular modulation tracks that modulate light as the code wheel rotates in front of a light source. In this example the tracks 308, 310 and 312 are designated W, V and U, respectively. The track 314 is an Outer Index track and the track 316 is an Inner Index track. The track 318 has a cyclic modulation pattern and is designated A/B. Track 306 is a monitor track and has no opaque regions.

FIG. 4 shows a signal 402 generated by a primary optical sensor, such as sensor 112, plotted as a function of the angle of the code wheel measured in degrees. The figure also shows the signal 404 generated by the monitor sensor 124. Signals 402 and 404 are compared by a comparator in the signal processing circuit to produce a digital signal 406.

FIG. 5 shows the modulated digital signals generated by signal processing circuit in response to the signals generated by the primary optical sensors as the code wheel rotates. The signals are shown as a function of angle in degrees. The signals for the W (508), V (510), U (512), Outer Index (514) and Inner Index (516) are shown. The Inner and Outer Index signals 514 and 516 provide once-per-revolution pulses for synchronization. In one application, the encoder is a commutator encoder and the U, V and W signals provide signals for controlling a brushless D.C. motor, for example. In another application the encoder is used for identifying the orientation of an object under motion control.

The present invention relates to a photodetector having a sensor head for sensing light modulated by a movable member. The member may be an optical mask, such as code wheel or code strip. The movable optical mask has one or more modulation tracks that may comprise etched metal, mylar, emulsion on glass or chrome on glass, for example. Alternatively, the moveable member may have a modulation pattern that reflects light in some regions and absorbs or transmits light in other regions.

Figure 6:
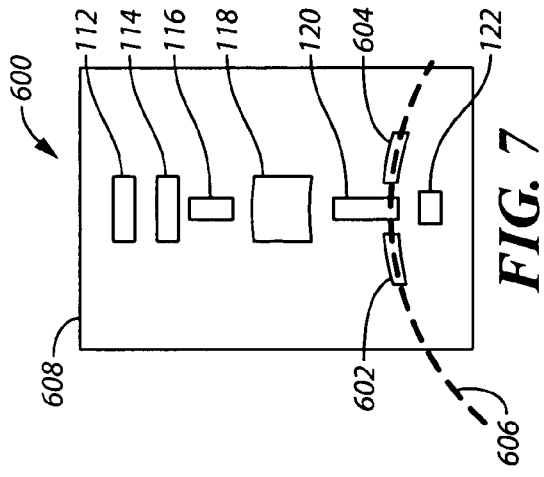
FIG. 6 is a diagram of an optical encoder sensor head in accordance with certain embodiments of the present invention.

In one embodiment, shown in FIG. 6, the sensor head 600 comprises a first optical sensor 602 and a second optical sensor 604, positioned in a line 606 substantially parallel to a modulation track, and a primary optical sensor 118, located between the first optical sensor 602 and the second optical sensor 604. The electrical signals output from the first and second optical sensors are summed in the signal processing circuit 608 to form a monitor signal. The monitor signal is used as a threshold signal to allow detection of light at the primary optical sensor. The detection is performed by a signal comparator in the signal processing circuit 608 that compares the electrical signal output from the primary optical sensor with the monitor signal, as described above with reference to FIG. 4. The signal processing circuit 608 may comprise an integrated circuit having analog elements, digital elements or a combination of analog and digital elements. The sensor head 600 may comprise an array of additional primary optical sensors 112, 114, 116, 120 and 122. The detection of signals from the primary optical sensors is also performed in the signal processing circuit 608. In this embodiment, the primary sensor 118 senses light passing through the A/B track that has a cyclic modulation pattern. The angle spanned by each of the first optical sensor 602 and the second optical sensor 604 is chosen to be an integer number of cycles of the cyclic modulation pattern. This ensures that the sensors have constant light exposure throughout the revolution of the code wheel.

In one embodiment of the invention, the combined area of the optical sensors 602 and 604 is approximately half that of a primary sensor 112, 114 or 122, so that the monitor signal is equal to approximately half of the maximum primary sensor output. This allows the monitor signal output to be used as a threshold signal without amplification or attenuation. The photosensors 112, 114 and 122 may have the same area. In general, the combined area of the optical sensors 602 and 604 is less than the area of the primary sensor.

It will apparent to those of ordinary skill in the art that a single monitor sensor (602 or 604) may be used. However, the use of two optical sensors, one either side of photosensor 118, provides a better light averaging. The optical sensors may be photodiodes responsive to light of different wavelength.

Figure 7:
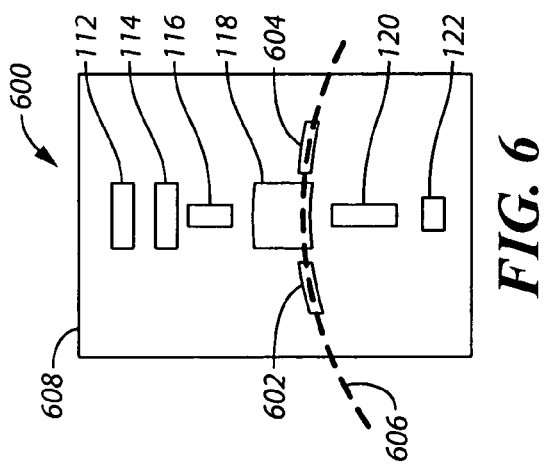
FIG. 7 is a diagram of a further optical encoder sensor head in accordance with certain embodiments of the present invention.

A further embodiment of a sensor head 600, in accordance with certain aspects of the invention, is shown in FIG. 7. The sensor head 600 comprises a first optical sensor 602 and a second optical sensor 604, positioned in a line 606 substantially parallel to a modulation track, and a primary optical sensor 120, located between the first optical sensor 602 and the second optical sensor 604. The electrical signals output from the first and second optical sensors are summed in the signal processing circuit 608 to form a monitor signal. The monitor signal is used as a threshold signal to allow detection of light at the primary optical sensor. The detection is performed by a signal comparator in the signal processing circuit 608 that compares the electrical signal output from the primary optical sensor with the monitor signal.

Figure 8:
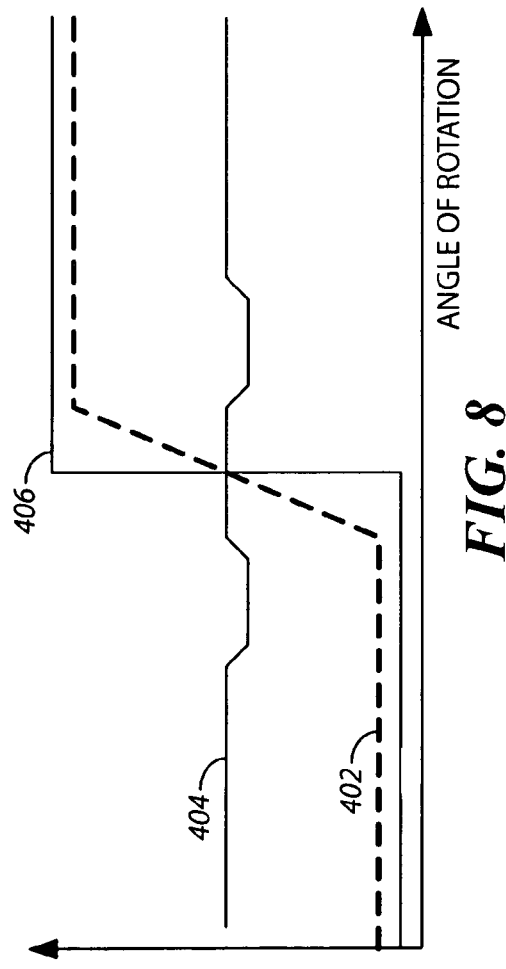
FIG. 8 is a graph of encoder signals in accordance with certain embodiments of the present invention.

FIG. 8 shows a signal 402 generated by a primary optical sensor, such as sensor 112, plotted as a function of the angle of the code wheel measured in degrees. The figure also shows the signal 404 generated by the summing the signals from the monitor sensors 602 and 604. The signal 404 has regions of reduced level that occur when the opaque region of the Inner Index track (region 316 in FIG. 3) pass a monitor sensor. However, the transitions in the other modulation tracks may be selected to occur when the signal 404 is at its maximum level. Signals 402 and 404 are compared by a comparator in the signal processing circuit to produce a digital signal 406.

Figure 9:
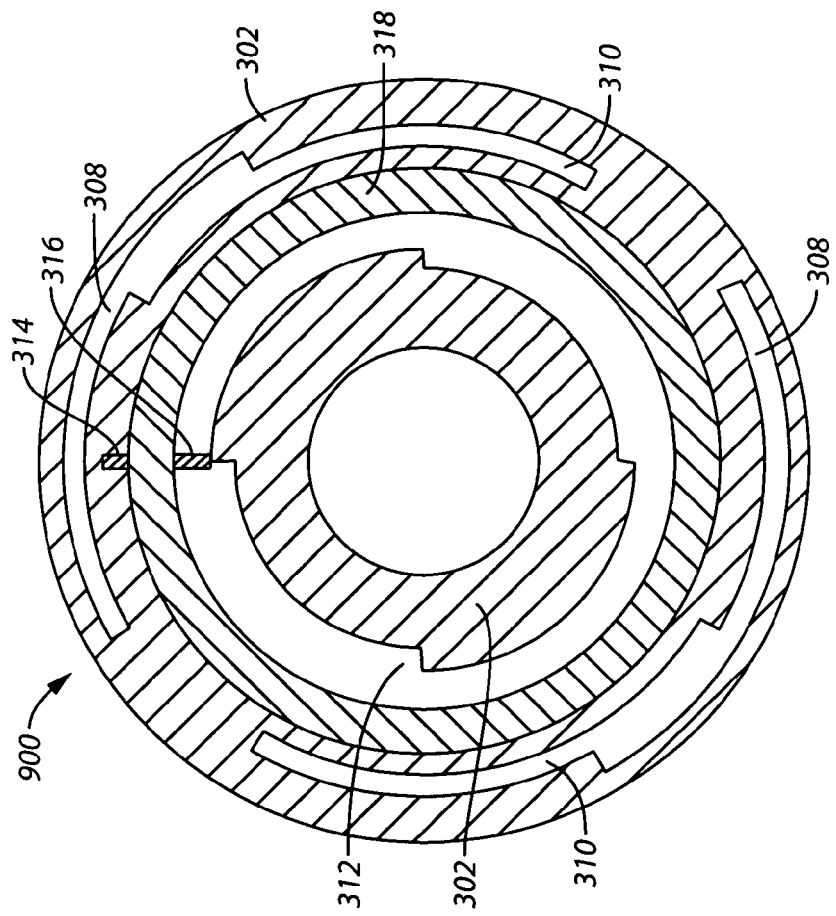
FIG. 9 is a diagram of a code wheel in accordance with certain embodiments of the present invention.

FIG. 9 is a diagram of a code wheel in accordance with certain embodiments of the present invention. The code wheel comprises a number of opaque regions (302 and 316), a number of transparent regions (304, 312 and 314) and a cyclic patterned region 318. These regions provide a number of circular modulation tracks that modulate light as the code wheel rotates in front of a light source. In this example the tracks 308, 310 and 312 are designated W, V and U, respectively. The track 314 is an Outer Index track and the track 316 is an Inner Index track. The track 318 has a cyclic modulation pattern and is designated A/B. In comparison with the code wheel of FIG. 3, the monitor track 306 of the prior art has been eliminated. This allows for a reduction in the size of the sensor head and/or the code wheel.

The sensor head of the present invention may contain optical sensors for receiving light one or more modulation tracks.

In accordance with an embodiment of the invention, the optical sensor array and the signal processing circuit are integrated on a single integrated circuit. In a further embodiment the optical sensor array and the signal processing circuit are on separate integrated circuits.

In accordance with a still further embodiment of the invention, a light source and optical lens are incorporated into the sensor head.

The sensor head may be used to detect light reflected from a moveable member bearing a modulation pattern. The moveable member may be a code wheel or a code strip, for example, that absorbs reflects or transmits light in different regions.

Figure 10:
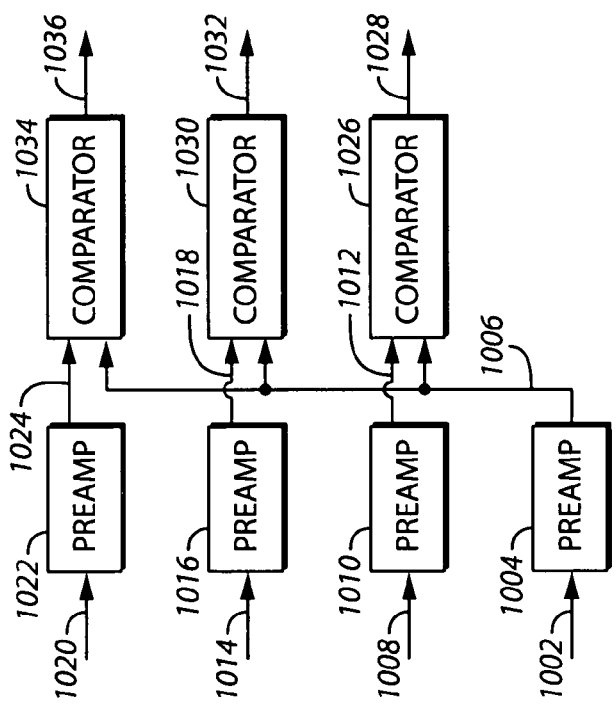
FIG. 10 is a block diagram of a signal processing circuit in accordance with certain embodiments of the present invention.

FIG. 10 is a block diagram of a signal processing circuit in accordance with certain embodiments of the present invention. Referring to FIG. 10, the signal 1002 is received from a monitor optical sensor. This may be a photocurrent signal for example. The signal 1002 is amplified in preamplifier 1004 to produce a monitor signal 1006. The signal 1008 is received from a first primary optical sensor and is amplified in preamplifier 1010 to produce a first primary signal 1012. Signal 1014 from a second primary optical sensor is amplified in preamplifier 1016 to produce second primary signal 1018. The signal 1020 from a third primary optical sensor is amplified in a preamplifier 1022 to produce a third primary signal 1024. The first primary signal 1012 is compared to the monitor signal 1006 in a comparator 1026 to produce a first digital signal 1028. The first digital signal 1028 is indicative of whether light has been detected at the first primary optical sensor. A second primary signal 1018 is compared to the monitor signal 1006 in a comparator 1030 to produce a second digital signal 1032. The second digital signal 1032 is indicative of whether light has been detected at a corresponding second primary optical sensor. A third primary signal 1024 is compared to the monitor signal 1006 in a comparator 1034 to produce a third digital signal 1036. Third digital signal 1036 is indicative of whether light has been detected at a corresponding third primary optical sensor.

Figure 11:
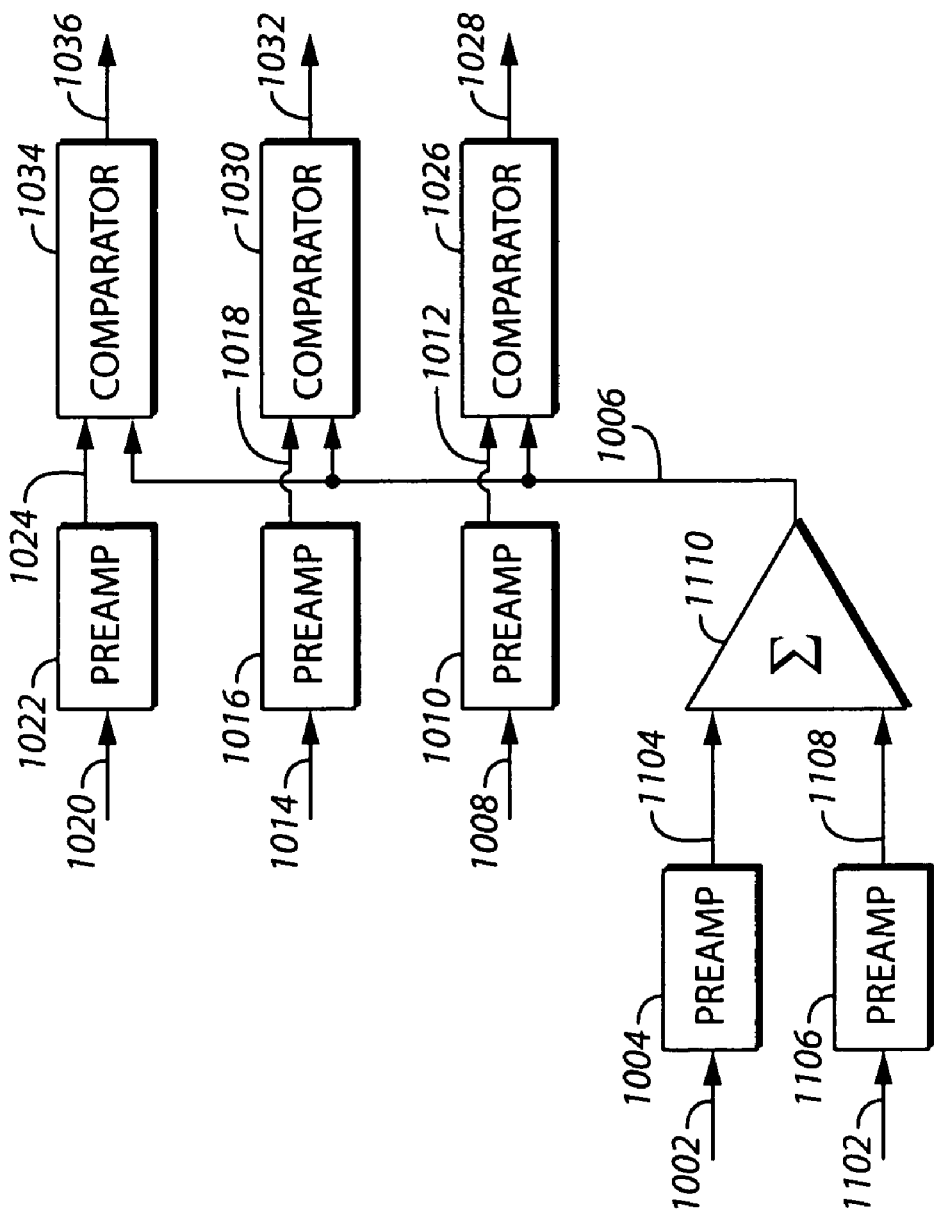
FIG. 11 is a further block diagram of a signal processing circuit in accordance with certain embodiments of the present invention.

FIG. 11 is a further block diagram of a detector circuit in accordance with certain embodiments of the present invention. Referring to FIG. 11, the signal 1002 is received from a first monitor optical sensor and the signal 1102 is received from a second monitor optical sensor. These may be photocurrent signals for example. The signal 1002 is amplified in preamplifier 1004 to produce amplified signal 1104. The signal 1102 is amplified in preamplifier 1106 to produce amplified signal 1108. The amplified signals 1104 and 1108 are summed in signal summer 1110 to produce the monitor signal 1006.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A sensor head for sensing light modulated by a movable member having a modulation track, the sensor head comprising:
   a first optical sensor, positioned to receive light from the modulation track and produce a monitor signal therefrom;
   a primary optical sensor, positioned to receive light from the modulation track and produce a primary signal therefrom; and
   a signal comparator operable to compare the primary signal with the monitor signal;
   wherein the modulation track has a periodic modulation pattern having a repeat distance and wherein the span of the first optical sensor is an integer multiple of the repeat distance.

2. A sensor head in accordance with claim 1, further comprising:
   a second optical sensor, positioned to receive light from the modulation track; and
   a signal summer operable to sum electrical signals output from the first and second optical sensors to form the monitor signal.

3. A sensor head in accordance with claim 2, wherein the primary optical sensor is positioned between the first and second optical sensors.

4. A sensor head in accordance with claim 2, wherein the primary optical sensor has an area greater than the sum of areas of the first and second optical sensor.

5. A sensor head in accordance with claim 1, wherein the movable member has a plurality of modulation tracks, further comprising:
   an array of primary optical sensors, each primary optical sensor of the array of primary optical sensors being positioned to receive modulated light from a modulation track of the plurality of modulation tracks; and
   a plurality of signal comparators, each operable to compare an electrical signal output from a primary optical sensor of the array of primary optical sensors with the monitor signal.

6. A sensor head in accordance with claim 5, wherein modulation transitions in the plurality of modulation tracks occur when the monitor signal is at a maximum level.

7. A sensor head in accordance with claim 5, wherein the array of primary optical sensors and the first optical sensor comprise a portion of an integrated circuit.

8. A sensor head in accordance with claim 1, wherein the primary optical sensor is positioned to receive modulated light reflected from the movable member.

9. A sensor head in accordance with claim 1, wherein the primary optical sensor is positioned to received modulated light transmitted through the movable member.

10. A sensor head in accordance with claim 1, wherein the primary optical sensor has an area greater than the first optical sensor.

11. An optical encoder comprising:
    a sensor head in accordance with claim 1;
    a light source operable to generate light; and
    a moveable member having a modulation track and operable to modulate the light to produce a modulated light.

12. An optical encoder in accordance with claim 11, wherein the moveable member is a moveable member selected from the group consisting of a code wheel and a code strip.

13. An optical encoder in accordance with claim 11, wherein the moveable member is positioned such that the primary and first optical sensors receive modulated light transmitted through the moveable member.

14. An optical encoder in accordance with claim 11, wherein the moveable member is positioned such that the primary and first optical sensors receive modulated light reflected from the moveable member.

15. A method for detecting a light signal modulated by a first modulation track on a moveable member, the method comprising:
    sensing the light signal modulated by the first modulation track in a first region to produce a first signal;
    sensing a light signal modulated by the first modulation track in at least one monitor region to produce a monitor signal;
    comparing the first signal with the monitor signal; and
    detecting the light signal when the first signal is greater than the monitor signal;
    wherein sensing the light signal modulated by the first modulation track in at least one monitor region comprises:
    sensing the light signal modulated by the first modulation track in a second region to produce a second signal;
    sensing the light signal modulated by the first modulation track in a third region to produce a third signal; and
    combining the second signal with the third signal to produce the monitor signal.

16. A method in accordance with claim 15, wherein the first region is located between the second region and the third region.

17. A method in accordance with claim 15, further comprising:
    sensing a light signal modulated by a second modulation track on the moveable member to produce a fourth signal;
    comparing the fourth signal with the monitor signal; and
    detecting the light signal modulated by the second modulation track when the fourth signal is greater than the monitor signal.

18. A method for detecting a light signal modulated by a first modulation track on a moveable member, the method comprising:

sensing the light signal modulated by the first modulation track in a first region to produce a first signal;
sensing a light signal modulated by the first modulation track in at least one monitor region to produce a monitor signal;
comparing the first signal with the monitor signal;
detecting the light signal when the first signal is greater than the monitor signal;
sensing a light signal modulated by a second modulation track on the moveable member to produce a fourth signal;
comparing the fourth signal with the monitor signal; and
detecting the light signal modulated by the second modulation track when the fourth signal is greater than the monitor signal.

* * * * *